US010008067B2

(12) United States Patent
Manessis (10) Patent No.: US 10,008,067 B2
(45) Date of Patent: Jun. 26, 2018

(54) SYSTEM AND METHOD FOR AUTHORIZING FINANCIAL TRANSACTIONS WITH ONLINE MERCHANTS

(75) Inventor: Thomas Manessis, Pacifica, CA (US)

(73) Assignee: VISA U.S.A. INC., San Francisco, CA (US)

( * ) Notice: Subject to any disclaimer, the term of this patent is extended or adjusted under 35 U.S.C. 154(b) by 720 days.

(21) Appl. No.: 12/483,419

(22) Filed: Jun. 12, 2009

(65) Prior Publication Data

US 2009/0313168 A1 Dec. 17, 2009

Related U.S. Application Data

(60) Provisional application No. 61/061,936, filed on Jun. 16, 2008.

(51) Int. Cl.
*G06Q 40/00* (2012.01)
*G06Q 20/00* (2012.01)
(Continued)

(52) U.S. Cl.
CPC ............ *G07F 7/122* (2013.01); *G06Q 20/20* (2013.01); *G06Q 20/341* (2013.01); *G06Q 20/40* (2013.01);
(Continued)

(58) Field of Classification Search
CPC .... G06Q 20/4018; G06Q 20/20; G06Q 20/40; G06Q 20/385; G06Q 20/341;
(Continued)

(56) References Cited

U.S. PATENT DOCUMENTS 4,423,287 A 12/1983 Zeidler
4,578,530 A 3/1986 Zeidler
(Continued)

FOREIGN PATENT DOCUMENTS

KR 10-1999-0078937 A 5/1999
KR 10-2005-0089427 A 9/2005

OTHER PUBLICATIONS

International Search Report and Written Opinion dated Aug. 7, 2009 in PCT Application No. PCT/US2009/047119 filed Jun. 12, 2009.
(Continued)

*Primary Examiner* — Mohammad Z Shaikh
(74) *Attorney, Agent, or Firm* — Kilpatrick, Townsend & Stockton LLP (57) ABSTRACT

A system for authorizing a financial transaction of a financial presentation device such as a credit or debit card being presented from a customer to an online merchant. The system includes a peripheral device having a processor configured to generate a dynamic verification value for the card which changes for each financial transaction, and to transmit the dynamic verification value to a user computer via an I/O interface during an online transaction. The system also includes an authentication computer having a memory for storing information used to generate a comparison verification value, a communication device for receiving the dynamic verification value originating from the peripheral device, a processor and an authentication module executable by the processor adapted to generate the comparison verification value using information stored in memory. The authentication computer determines whether to authorize the financial transaction based on whether the comparison verification value matches the received dynamic verification value.

18 Claims, 5 Drawing Sheets

(51) Int. Cl.
- *G06K 5/00* (2006.01)
- *G07F 7/12* (2006.01)
- *G06Q 20/20* (2012.01)
- *G06Q 20/34* (2012.01)
- *G06Q 20/40* (2012.01)
- *G07F 7/10* (2006.01)

(52) U.S. Cl.
CPC ... *G06Q 20/4093* (2013.01); *G06Q 20/40975* (2013.01); *G07F 7/1008* (2013.01)

(58) Field of Classification Search
CPC .............. G06Q 20/32; G06Q 20/3674; G06Q 20/4012; H04L 9/16; H04L 63/068
USPC ..... 705/35, 39, 40, 51, 52, 44, 37; 713/172; 715/224
See application file for complete search history.

(56) References Cited

U.S. PATENT DOCUMENTS

| | | | |
|---|---|---|---|
| 4,646,351 | A | 2/1987 | Asbo et al. |
| 4,701,601 | A | 10/1987 | Francini et al. |
| 4,734,564 | A | 3/1988 | Boston et al. |
| 4,812,628 | A | 3/1989 | Boston et al. |
| 4,822,985 | A | 4/1989 | Boggan et al. |
| 4,870,259 | A | 9/1989 | Boggan et al. |
| 4,906,826 | A | 3/1990 | Spencer |
| 4,908,521 | A | 3/1990 | Boggan et al. |
| 4,943,707 | A | 7/1990 | Boggan |
| 5,276,311 | A | 1/1994 | Hennige |
| 5,396,624 | A | 3/1995 | Campbell, Jr. |
| 5,450,491 | A | 9/1995 | McNair |
| 5,450,537 | A | 9/1995 | Hirai et al. |
| 5,465,206 | A | 11/1995 | Hilt et al. |
| 5,477,038 | A | 12/1995 | Levine et al. |
| 5,500,512 | A | 3/1996 | Langhans et al. |
| 5,500,513 | A | 3/1996 | Langhans et al. |
| 5,621,201 | A | 4/1997 | Langhans et al. |
| 5,623,552 | A | 4/1997 | Lane |
| 5,627,355 | A * | 5/1997 | Rahman ................. G06K 19/07 235/375 |
| 5,640,577 | A | 6/1997 | Scharmer |
| 5,703,344 | A | 12/1997 | Bezy et al. |
| 5,742,845 | A | 4/1998 | Wagner |
| 5,771,101 | A | 6/1998 | Bramall |
| 5,794,259 | A | 8/1998 | Kikinis |
| 5,883,810 | A | 3/1999 | Franklin et al. |
| 5,920,847 | A | 7/1999 | Kolling et al. |
| 5,963,925 | A | 10/1999 | Kolling et al. |
| 5,974,430 | A | 10/1999 | Mutschler, III et al. |
| RE36,365 | E | 11/1999 | Levine et al. |
| 6,000,832 | A | 12/1999 | Franklin et al. |
| 6,003,014 | A | 12/1999 | Lee et al. |
| 6,003,763 | A | 12/1999 | Gallagher et al. |
| 6,005,942 | A | 12/1999 | Chan et al. |
| 6,018,717 | A | 1/2000 | Lee et al. |
| 6,019,284 | A | 2/2000 | Freeman et al. |
| 6,044,349 | A | 3/2000 | Tolopka et al. |
| 6,067,621 | A | 5/2000 | Yu et al. |
| 6,233,683 | B1 | 3/2001 | Chan et al. |
| RE37,122 | E | 4/2001 | Levine et al. |
| 6,227,447 | B1 | 5/2001 | Campisano |
| 6,247,129 | B1 | 6/2001 | Keathley et al. |
| 6,263,446 | B1 | 7/2001 | Kausik et al. |
| 6,282,522 | B1 | 8/2001 | Davis et al. |
| 6,285,991 | B1 | 9/2001 | Powar |
| 6,298,336 | B1 | 10/2001 | Davis et al. |
| 6,341,724 | B2 | 1/2002 | Campisano |
| 6,367,011 | B1 | 4/2002 | Lee et al. |
| 6,385,595 | B1 | 5/2002 | Kolling et al. |
| 6,408,284 | B1 | 6/2002 | Hilt et al. |
| 6,421,729 | B1 | 7/2002 | Paltenghe et al. |
| 6,438,527 | B1 | 8/2002 | Powar |
| 6,481,632 | B2 | 11/2002 | Wentker et al. |
| 6,490,601 | B1 | 12/2002 | Markus et al. |
| 6,499,042 | B1 | 12/2002 | Markus |
| 6,560,581 | B1 | 5/2003 | Fox et al. |
| 6,571,339 | B1 | 5/2003 | Danneels et al. |
| RE38,255 | E | 9/2003 | Levine et al. |
| 6,808,111 | B2 | 10/2004 | Kashef et al. |
| 6,850,996 | B2 | 2/2005 | Wagner |
| 6,873,974 | B1 | 3/2005 | Schutzer |
| 6,907,476 | B2 | 6/2005 | Wagner |
| 6,925,562 | B2 * | 8/2005 | Gulcu et al. .................. 713/172 |
| 6,980,970 | B2 | 12/2005 | Krueger et al. |
| 6,985,583 | B1 * | 1/2006 | Brainard ................. G06F 21/31 380/277 |
| 7,007,840 | B2 | 3/2006 | Davis |
| 7,028,008 | B2 | 4/2006 | Powar |
| 7,039,611 | B2 | 5/2006 | Devine |
| 7,051,929 | B2 | 5/2006 | Li |
| 7,062,706 | B2 | 6/2006 | Maxwell et al. |
| 7,096,363 | B2 * | 8/2006 | Kon et al. ..................... 713/176 |
| 7,099,850 | B1 | 8/2006 | Mann, II et al. |
| 7,103,576 | B2 | 9/2006 | Mann, III et al. |
| 7,159,180 | B2 | 1/2007 | Ward |
| 7,177,848 | B2 | 2/2007 | Hogan et al. |
| 7,210,169 | B2 | 4/2007 | Smith et al. |
| 7,216,292 | B1 | 5/2007 | Snapper et al. |
| 7,227,950 | B2 | 6/2007 | Faith et al. |
| 7,231,045 | B1 | 6/2007 | Parrott |
| 7,243,853 | B1 | 7/2007 | Levy et al. |
| 7,254,569 | B2 | 8/2007 | Goodman et al. |
| 7,257,581 | B1 | 8/2007 | Steele et al. |
| 7,275,263 | B2 | 9/2007 | Bajikar et al. |
| 7,280,981 | B2 | 10/2007 | Huang et al. |
| 7,328,850 | B2 | 2/2008 | Sines |
| 7,334,184 | B1 | 2/2008 | Simons |
| 7,343,351 | B1 | 3/2008 | Bishop et al. |
| 7,346,587 | B2 | 3/2008 | Goldstein et al. |
| 7,347,361 | B2 | 3/2008 | Lovett |
| 7,350,139 | B1 * | 3/2008 | Simons ........................ 715/224 |
| 7,356,516 | B2 | 4/2008 | Richey et al. |
| 7,356,706 | B2 | 4/2008 | Scheurich |
| 7,366,703 | B2 | 4/2008 | Gray et al. |
| 7,379,919 | B2 | 5/2008 | Hogan et al. |
| 7,412,420 | B2 | 8/2008 | Holdsworth |
| 7,415,443 | B2 | 8/2008 | Hobson et al. |
| 7,427,033 | B1 * | 9/2008 | Roskind ................. G06F 21/34 235/380 |
| 7,437,575 | B2 | 10/2008 | Dennis et al. |
| 7,437,757 | B2 | 10/2008 | Holdsworth |
| 7,483,845 | B2 | 1/2009 | Vetelainen |
| 7,506,818 | B2 * | 3/2009 | Beenau ............. G06F 17/30725 235/380 |
| 7,512,975 | B2 | 3/2009 | Aissi |
| 7,533,063 | B2 | 5/2009 | Kianian |
| 7,533,828 | B2 | 5/2009 | Ong |
| 7,568,631 | B2 | 8/2009 | Gibbs et al. |
| 7,593,875 | B2 * | 9/2009 | Granite et al. .................. 705/35 |
| 7,627,531 | B2 | 12/2009 | Breck et al. |
| 7,660,779 | B2 | 2/2010 | Goodman et al. |
| 7,664,699 | B1 | 2/2010 | Powell |
| 7,689,459 | B2 | 3/2010 | Capurso et al. |
| 7,693,790 | B2 * | 4/2010 | Lawlor et al. .................. 705/40 |
| 7,716,596 | B2 | 5/2010 | Cao et al. |
| 7,740,168 | B2 * | 6/2010 | Hammad ............. G06Q 20/04 235/379 |
| 7,761,374 | B2 * | 7/2010 | Sahota et al. .................... 705/39 |
| 7,849,014 | B2 | 12/2010 | Erikson |
| 7,891,560 | B2 * | 2/2011 | Hammad ............. G06F 21/31 235/380 |
| 7,899,753 | B1 * | 3/2011 | Everhart ............. G06Q 20/0855 705/64 |
| 7,922,082 | B2 * | 4/2011 | Muscato ....................... 235/380 |
| 8,313,022 | B2 * | 11/2012 | Hammad ............. G06F 21/34 235/375 |
| 8,326,759 | B2 * | 12/2012 | Hammad ............. G06Q 20/322 235/380 |
| 8,359,630 | B2 * | 1/2013 | Manessis ............. G06Q 20/04 726/2 |

(56) References Cited

U.S. PATENT DOCUMENTS

| | | | | |
|---|---|---|---|---|
| 8,364,594 B2* | 1/2013 | Hammad | G06Q 20/3552 | 705/30 |
| 8,423,415 B2* | 4/2013 | Sahota | G06Q 20/10 | 705/16 |
| 8,504,451 B2* | 8/2013 | Faith | G06Q 20/20 | 705/35 |
| 8,534,564 B2* | 9/2013 | Hammad | G06F 21/34 | 235/454 |
| 8,602,293 B2* | 12/2013 | Hammad | G06Q 20/12 | 235/375 |
| 9,251,637 B2* | 2/2016 | Ashfield | G06Q 20/24 | |
| 2001/0032182 A1 | 10/2001 | Kumar et al. | | |
| 2001/0054148 A1 | 12/2001 | Hoornaert et al. | | |
| 2002/0111919 A1 | 8/2002 | Weller et al. | | |
| 2002/0116330 A1* | 8/2002 | Hed et al. | 705/39 | |
| 2002/0153424 A1 | 10/2002 | Li | | |
| 2002/0161704 A1 | 10/2002 | Powar | | |
| 2002/0178112 A1 | 11/2002 | Goeller et al. | | |
| 2002/0180584 A1* | 12/2002 | McGregor | G05B 19/0425 | 340/5.26 |
| 2002/0194138 A1 | 12/2002 | Dominguez et al. | | |
| 2002/0194503 A1 | 12/2002 | Faith et al. | | |
| 2003/0105964 A1* | 6/2003 | Brainard | G06Q 20/32 | 713/178 |
| 2003/0115142 A1 | 6/2003 | Brickell et al. | | |
| 2003/0120593 A1 | 6/2003 | Bansal et al. | | |
| 2003/0182241 A1* | 9/2003 | Everhart | G06Q 20/341 | 705/65 |
| 2003/0195843 A1 | 10/2003 | Matsuda et al. | | |
| 2003/0200184 A1 | 10/2003 | Dominguez et al. | | |
| 2003/0212642 A1 | 11/2003 | Weller et al. | | |
| 2003/0233292 A1 | 12/2003 | Richey et al. | | |
| 2004/0044621 A1 | 3/2004 | Huang et al. | | |
| 2004/0059688 A1 | 3/2004 | Dominguez et al. | | |
| 2004/0210566 A1 | 10/2004 | Smith et al. | | |
| 2004/0220964 A1 | 11/2004 | Shiftan et al. | | |
| 2004/0230489 A1* | 11/2004 | Goldthwaite et al. | 705/26 | |
| 2005/0015588 A1* | 1/2005 | Lin | G06F 21/34 | 713/159 |
| 2005/0029344 A1 | 2/2005 | Davis | | |
| 2005/0036611 A1 | 2/2005 | Seaton et al. | | |
| 2005/0043997 A1* | 2/2005 | Sahota | G06Q 20/10 | 705/16 |
| 2005/0077349 A1* | 4/2005 | Bonalle et al. | 235/380 | |
| 2005/0102234 A1 | 5/2005 | Devine | | |
| 2005/0149455 A1 | 7/2005 | Bruesewitz et al. | | |
| 2005/0154877 A1 | 7/2005 | Trench | | |
| 2005/0177510 A1 | 8/2005 | Hilt et al. | | |
| 2005/0246278 A1 | 11/2005 | Gerber et al. | | |
| 2005/0250473 A1* | 11/2005 | Brown et al. | 455/411 | |
| 2005/0269402 A1* | 12/2005 | Spitzer | G06Q 20/04 | 235/380 |
| 2006/0006224 A1 | 1/2006 | Modi | | |
| 2006/0049263 A1 | 3/2006 | Ou et al. | | |
| 2006/0131393 A1 | 6/2006 | Cok et al. | | |
| 2006/0152484 A1* | 7/2006 | Rolus Borgward | 345/157 | |
| 2006/0161789 A1 | 7/2006 | Doughty et al. | | |
| 2006/0167784 A1* | 7/2006 | Hoffberg | 705/37 | |
| 2006/0179007 A1 | 8/2006 | Davis | | |
| 2006/0218098 A1 | 9/2006 | Walker et al. | | |
| 2006/0278698 A1 | 12/2006 | Lovett | | |
| 2007/0005613 A1 | 1/2007 | Singh et al. | | |
| 2007/0005774 A1 | 1/2007 | Singh et al. | | |
| 2007/0055597 A1 | 3/2007 | Patel et al. | | |
| 2007/0055630 A1 | 3/2007 | Gauthier et al. | | |
| 2007/0100691 A1 | 5/2007 | Patterson | | |
| 2007/0136211 A1* | 6/2007 | Brown | G07F 7/1083 | 705/75 |
| 2007/0143605 A1 | 6/2007 | Metke et al. | | |
| 2007/0208671 A1 | 9/2007 | Brown et al. | | |
| 2008/0029593 A1* | 2/2008 | Hammad | G06Q 20/04 | 235/380 |
| 2008/0029607 A1* | 2/2008 | Mullen | G06K 19/077 | 235/492 |
| 2008/0034221 A1 | 2/2008 | Hammad et al. | | |
| 2008/0040285 A1* | 2/2008 | Wankmueller | G06Q 20/32 | 705/67 |
| 2008/0071680 A1 | 3/2008 | Sheets | | |
| 2008/0071682 A1 | 3/2008 | Dominguez | | |
| 2008/0091619 A1 | 4/2008 | Perlman et al. | | |
| 2008/0110983 A1 | 5/2008 | Ashfield | | |
| 2008/0120236 A1* | 5/2008 | Faith | G06Q 20/20 | 705/44 |
| 2008/0167991 A1 | 7/2008 | Carlson et al. | | |
| 2008/0177796 A1 | 7/2008 | Eldering | | |
| 2008/0203151 A1 | 8/2008 | Dixon et al. | | |
| 2008/0203152 A1 | 8/2008 | Hammad et al. | | |
| 2008/0203170 A1 | 8/2008 | Kalliske et al. | | |
| 2008/0228653 A1 | 9/2008 | Holdsworth | | |
| 2008/0289022 A1 | 11/2008 | Chiu | | |
| 2008/0306850 A1* | 12/2008 | Horvath | G06Q 20/20 | 705/35 |
| 2009/0006646 A1 | 1/2009 | Duarte | | |
| 2009/0031407 A1* | 1/2009 | Kuang | G06F 21/31 | 726/7 |
| 2009/0055893 A1* | 2/2009 | Manessis et al. | 726/2 | |
| 2009/0065571 A1* | 3/2009 | Jain | G06K 19/07739 | 235/379 |
| 2009/0134218 A1* | 5/2009 | Yuzon et al. | 235/382 | |
| 2009/0144556 A1* | 6/2009 | Plet et al. | 713/185 | |
| 2009/0173782 A1* | 7/2009 | Muscato | G06Q 20/10 | 235/379 |
| 2009/0248579 A1* | 10/2009 | Kaminski et al. | 705/67 | |
| 2009/0307493 A1 | 12/2009 | Smith | | |
| 2009/0313168 A1 | 12/2009 | Manessis | | |
| 2010/0023453 A1 | 1/2010 | Keresman et al. | | |
| 2010/0084476 A1 | 4/2010 | Zellner et al. | | |
| 2010/0114776 A1 | 5/2010 | Weller et al. | | |
| 2010/0223184 A1 | 9/2010 | Perlman | | |
| 2010/0257102 A1 | 10/2010 | Perlman | | |
| 2010/0274692 A1 | 10/2010 | Hammad | | |
| 2010/0274721 A1 | 10/2010 | Hammad | | |
| 2010/0293189 A1 | 11/2010 | Hammad | | |
| 2010/0293382 A1* | 11/2010 | Hammad | 713/173 | |
| 2010/0306105 A1 | 12/2010 | Walker et al. | | |
| 2011/0101093 A1* | 5/2011 | Ehrensvard | 235/380 | |
| 2011/0106601 A1 | 5/2011 | Perlman et al. | | |
| 2011/0106674 A1 | 5/2011 | Perlman et al. | | |
| 2011/0106675 A1 | 5/2011 | Perlman et al. | | |
| 2011/0119155 A1 | 5/2011 | Hammad et al. | | |
| 2011/0186626 A1 | 8/2011 | Manessis et al. | | |

OTHER PUBLICATIONS

U.S. Appl. No. 12/778,446, filed Oct. 29, 2009, Perlman, 59 pages.
U.S. Appl. No. 12/778,459, filed Oct. 29, 2009, Perlman, 58 pages.
U.S. Appl. No. 12/778,485, filed Oct. 29, 2009, Perlman et al., 60 pages.
U.S. Appl. No. 12/939,963, filed Nov. 4, 2010, Hammad et al., 105 pages.
U.S. Appl. No. 61/061,936, filed Jun. 16, 2008, Manessis, 12 pages.
U.S. Appl. No. 61/112,124, filed Nov. 6, 2008, Weller et al., 61 pages.
U.S. Appl. No. 61/178,636, filed May 15, 2009, Hammad, 58 pages.
U.S. Appl. No. 61/256,095, filed Oct. 29, 2009, Perlman, 40 pages.
U.S. Appl. No. 61/256,136, filed Oct. 29, 2009, Perlman, 64 pages.
U.S. Appl. No. 61/256,141, filed Oct. 29, 2009, Perlman, 38 pages.
U.S. Appl. No. 61/256,143, filed Oct. 29, 2009, Perlman et al., 29 pages.
U.S. Appl. No. 61/256,147, filed Oct. 29, 2009, Perlman, 41 pages.
U.S. Appl. No. 61/258,194, filed Nov. 4, 2009, Hammad, 147 pages.

* cited by examiner

| Transaction Number | Dynamic Verification Value |
|---|---|
| 1 | 867 |
| 2 | 148 |
| 3 | 360 |
| 4 | 089 |
| 5 | 388 |
| 6 | 476 |
| 7 | 136 |
| 8 | 588 |
| 9 | 908 |
| 10 | 025 |
| 11 | 673 |
| 12 | 045 |
| 13 | 259 |
| 14 | 676 |
| 15 | 346 |
| 16 | 967 |
| 17 | 858 |
| 18 | 462 |
| 19 | 153 |
| 20 | 500 |
| 21 | 934 |
| 22 | 435 |
| 23 | 385 |
| 24 | 081 |
| 25 | 553 |
| 26 | 793 |
| 27 | 146 |
| 28 | 111 |
| 29 | 857 |
| 30 | 725 |
| 31 | 010 |
| 32 | 967 |
| 33 | 827 |
| 34 | 516 |
| 35 | 078 |
| 36 | 255 |

SYSTEM AND METHOD FOR AUTHORIZING FINANCIAL TRANSACTIONS WITH ONLINE MERCHANTS

CROSS REFERENCE TO RELATED APPLICATIONS

This application claims the benefit of priority under 35 U.S.C. Section 119(e) to U.S. Provisional Application Ser. No. 61/061,936, filed Jun. 16, 2008, entitled "Method And System Of Authenticating A Financial Presentation Device Using A Token", which is fully incorporated by reference herein.

FIELD OF THE INVENTION

The present invention relates to data processing, and more particularly relates to a system and method for authorizing financial transactions of online merchants.

BACKGROUND OF THE INVENTION

The ability to conduct financial and commercial transactions online via the World Wide Web has proven to be a great convenience and a boost to economic activity. Since payments to online merchants generally cannot be done with cash or checks, most online merchants accept payments from their customers via payment accounts such as credit or debit card accounts. However, when using such payment accounts in online transactions, there is an associated risk of counterfeit and fraud because such payment account information can be discovered and pirated by unauthorized parties. For example, if a customer uses a financial presentation device such as a credit card or debit card to make a purchase online, the name of the customer, the credit card number and expiration date, and other sensitive information is entered through the online merchant's web page and passed electronically through a communication channel that may be compromised.

One way to prevent the unauthorized third party use of a financial presentation device is to require the use of dynamic verification data each time a transaction takes place. Dynamic verification data is data that is uniquely associated with a specific financial presentation device, wherein the verification data dynamically changes from transaction to transaction. Therefore, even if a third party was able to steal the account information including the verification data used during a transaction, such information would be insufficient for subsequent unauthorized transactions because they would require different verification data.

Commonly assigned U.S. patent application Ser. No. 12/032,095 entitled "DYNAMIC PAYMENT DEVICE CHARACTERISTICS", which is incorporated by reference herein, describes a system and method in which a credit card is embedded with a display and a processor that is adapted to generate a number shown on the display. This number is dynamically generated for each transaction and can be used as a card verification value (CVV). Accordingly, this dynamically generated CVV can be entered as verification data (e.g., via a keyboard) onto a web page provided by a merchant web site during check out.

However, it has been found that providing a financial presentation device with a processor and display is not cost-effective and requires a significant change in the manufacturing process of financial presentation devices. It would be desirable to find an equally secure, convenient and cost-effective system and method for generating dynamic verification data for financial presentation devices.

SUMMARY OF THE DISCLOSURE

The present invention provides a system for authorizing a financial transaction of a financial presentation device that is presentable to online merchants. The system comprises a peripheral device that includes: 1) a memory for storing information used to generate a dynamic verification value for the financial presentation device, 2) an I/O interface adapted to be coupled to a user computer; and 3) a processor configured to generate a dynamic verification value for the financial transaction using the information stored in memory and to transmit the dynamic verification value to the user computer via the I/O interface. The system also comprises an authentication computer that includes: 1) a memory for storing information used to generate a comparison verification value, 2) a communication device adapted to receive the dynamic verification value generated by the peripheral device, 3) a processor coupled to the memory and the communication device, and 4) an authentication module executable by the processor and adapted to generate the comparison verification value using the information stored in memory and to determine whether to authorize the financial transaction based on a comparison between the comparison verification value and the dynamic verification value.

DETAILED DESCRIPTION OF THE INVENTION

For purposes of illustration and clarity, the present invention will be discussed in the context of using a credit card. However, persons of ordinary skill in the art will appreciate that the novel features disclosed herein apply to all types of portable financial presentation devices including, but not limited to, credit cards, debit cards, prepaid cards, electronic benefit cards, charge cards, smart cards, virtual cards, key chain devices, personal digital assistants, cell phones, stored value devices or the like so long as the device can be presented to a seller of goods or services for payment.

According to the present invention, an electronic peripheral device having an I/O interface for insertion into a port of a computer, such as a universal serial bus (USB) connector, is adapted to store either a series of verification values (e.g., a table of values) or an algorithm that dynamically generates verification values for authorizing a financial presentation device, such as a credit or debit card. During an online transaction, the peripheral device may be used by a customer during checkout to verify that the financial presentation device is being presented by an authorized user. When a customer enters information onto a web form of an online merchant site via a browser program, the peripheral device can generate the dynamic verification data associated with the customer's financial presentation device account and deliver the verification data to the browser program, i.e., by automatically filling in data into a web form of the online merchant site during checkout. During authorization of the transaction, a financial transaction facilitator, such as VISANET™, or the issuer of the financial presentation device, receives the dynamic verification value and compares the verification value against a comparison verification value. The comparison verification value is generated using a series of data that corresponds to the series of dynamic verification values stored in the peripheral device, or by using an algorithm that corresponds to an algorithm stored on the peripheral device. When the dynamic verification value and the comparison verification value match, the customer's financial presentation device is authenticated and the financial transaction facilitator or issuer authorizes the online transaction.

Figure 1:
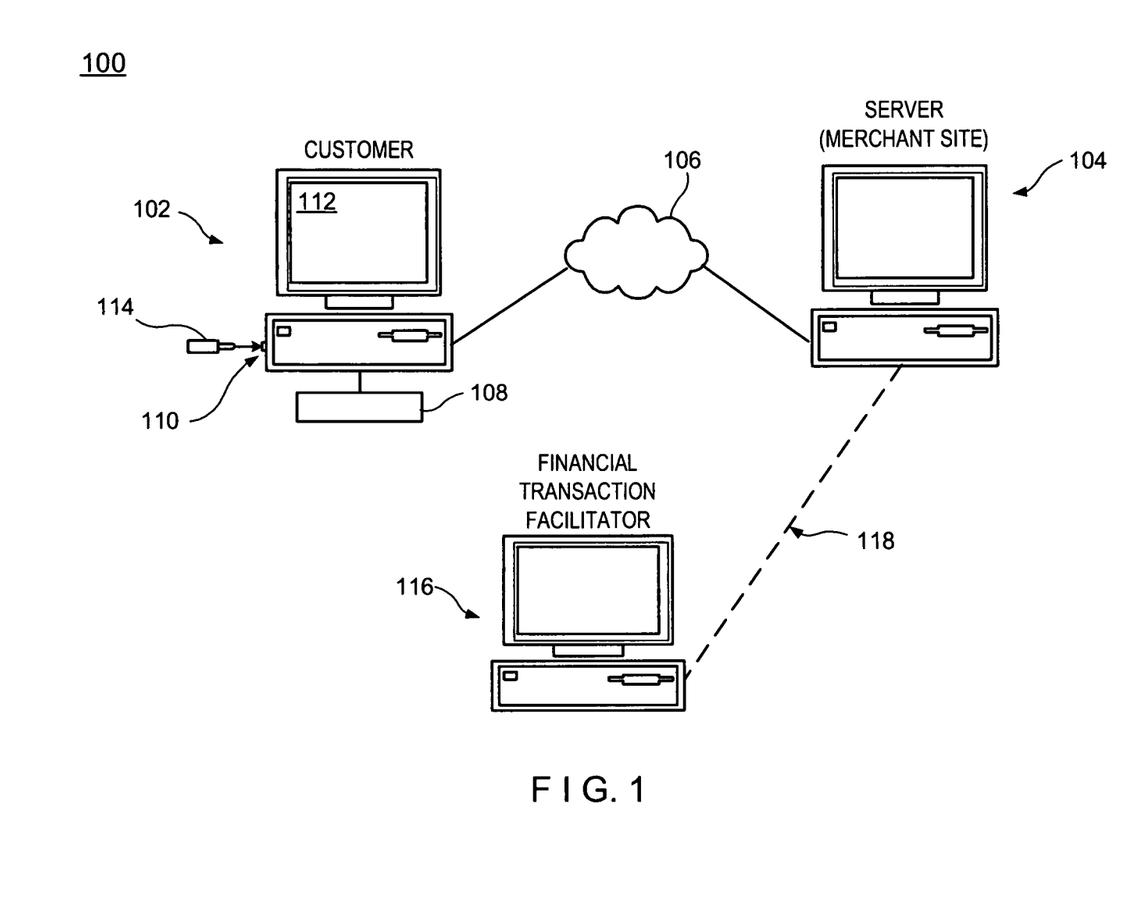
FIG. 1 is a block diagram of a system for dynamically authenticating a financial presentation device presentable to merchants according to an embodiment of the present invention.

FIG. 1 illustrates a block diagram of an exemplary system 100 for dynamically authenticating a financial presentation device according to an embodiment of the present invention. A customer computer 102 is coupled to a merchant server computer 104 that hosts an online merchant site over a public network 106 such as the Internet. Computer 102 includes, among other components, an input device such as a keyboard 108, one or more universal serial bus (USB) ports 110, and a display 112. Computer 102 executes a browser program for viewing HTML, XML documents on display 112. Computer 102 also includes an operating system (not shown) having commonly included device drivers including a HID (Human Interface Device) class driver and related specific device drivers.

The online merchant web site hosted by server 104 may display details of goods and services which the customer may select to purchase. The merchant web site will typically include a payment details screen (not shown) during "checkout" into which the customer may enter payment details via an input device 108 coupled to computer 102. The customer typically enters name, address and payment instrument information such as the account number and expiration date of a financial presentation device in the payment details screen.

According to the present invention, a peripheral device 114, which in some embodiments may be a USB peripheral device, is insertable into USB port 110 of computer 102 during checkout. The peripheral device 114 is initially configured by a financial presentation device authorizing entity 116 such as VISANET™ or the issuer of the financial presentation device. The peripheral device 114 includes functionality to generate a dynamic verification value (such as a three-digit number) based on stored values and/or an algorithm, and to emulate a keyboard so as to automatically input the generated dynamic verification value into an appropriate field of the payment details screen during checkout. As discussed below, computer 102 includes software (possibly downloaded as an applet from the merchant server 104) which is adapted to monitor for the presence of peripheral device 114 and includes a driver for converting signals received from the peripheral device into keyboard input information.

More specifically, peripheral device 114 is configured to include dynamic verification data that uniquely corresponds with a particular financial presentation device before the financial presentation device is assigned to a particular customer. The peripheral device 114 is then given to the customer along with the financial presentation device when it is issued. The peripheral device 114 is then used by the customer when performing online transactions with the financial presentation device to generate dynamic verification values, as described below. The authorizing entity 116 accordingly stores comparison verification values and/or algorithms corresponding to those stored on peripheral device 114, so that the values generated by peripheral device 114 can be verified by the authorizing entity 116. After verifying that the value generated by the peripheral device 114 matches the value stored by the authorizing entity 116, the associated financial presentation device is authorized by the authorizing entity 116 for that particular transaction.

After the customer has entered all of the requested information including the dynamic verification value into the payment details screen during checkout, the information is transmitted to server 104, which in turn sends the payment information to authorizing entity 116 over a secure private network 118. As discussed above, the authorizing entity 116 may be a financial transaction facilitator, such as VISANET™, which determines whether the dynamic verification value received from server 104 has been generated by an authorized peripheral device 114.

Figure 2:
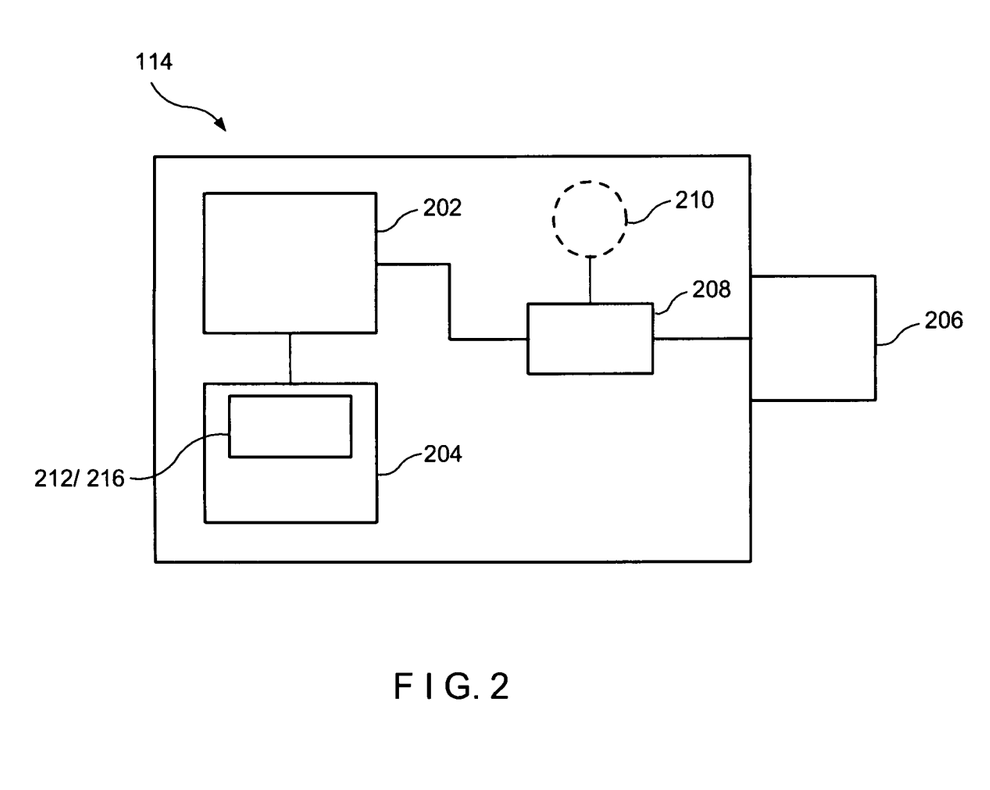
FIG. 2 is a block diagram of an exemplary peripheral device for generating dynamic verification values according to an embodiment of the present invention.

FIG. 2 is a block diagram of an exemplary peripheral device 114 for generating dynamic verification values according to an embodiment of the present invention. Peripheral device 114 includes a processor 202, which may be an inexpensive microprocessor chip or wired logic, and non-volatile memory 204 such as flash memory coupled to processor 202. Processor 202 is coupled to a I/O connector 206 via a switch 208, which may be manually activated by the customer through an activation mechanism 210 such as a button. Connector 206 is preferably a standard USB connector, which is generally available on any personal computer. In one embodiment, peripheral device 114 does not include a power source of its own and only receives power when connected to computer 102 via connector 206. Once the peripheral device 114 is connected to computer 102, the customer may then power on or off the peripheral device 114 by activating or deactivating switch 208, which allows or prevents power from reaching processor 202 from connector 206. In another embodiment, the peripheral device 114 is always powered on whenever it is connected to computer 102.

Figure 3:
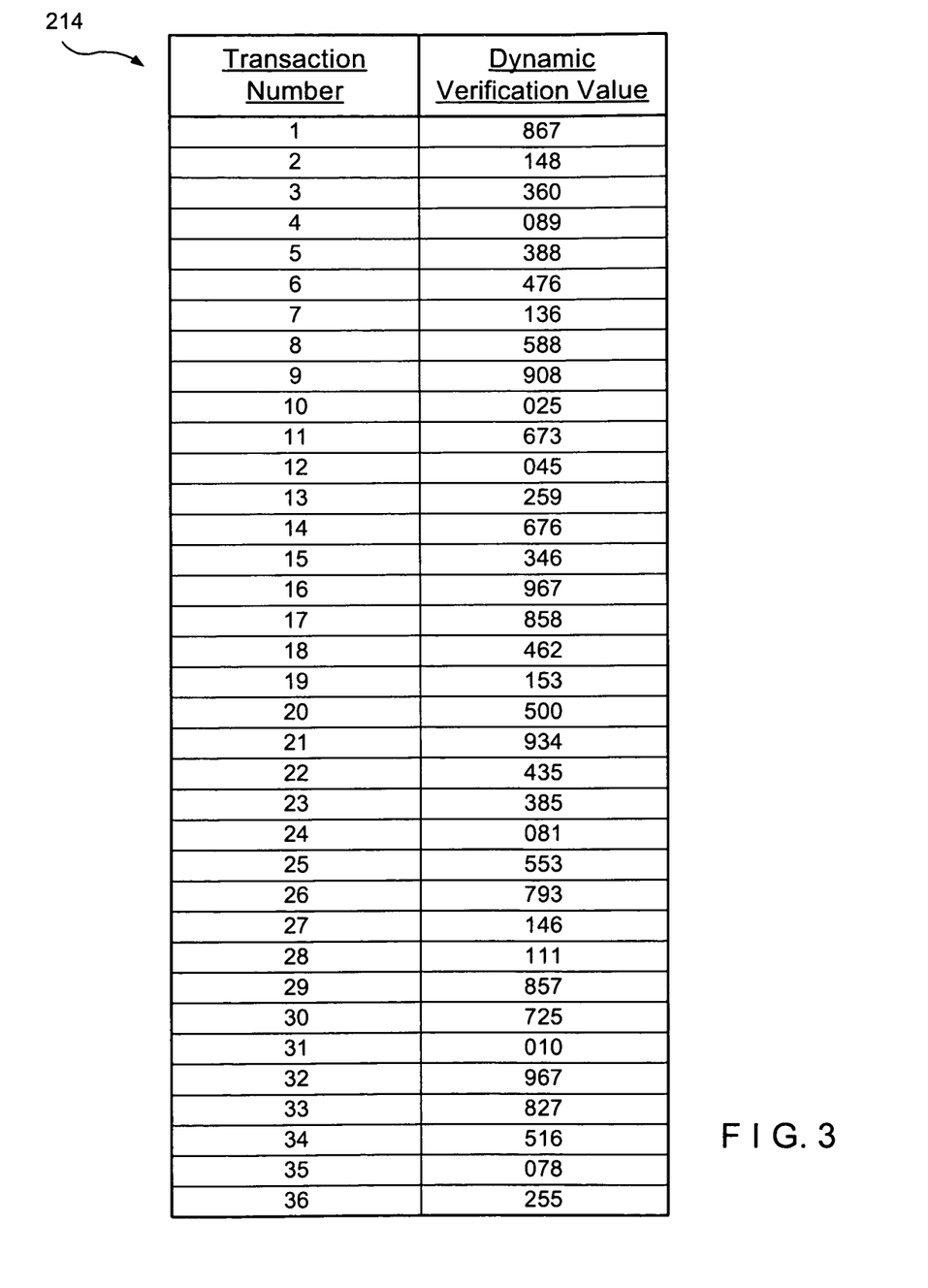
FIG. 3 shows a portion of a table of preset dynamic verification values for a financial presentation device according to an embodiment of the present invention.

In some embodiments, memory 204 of peripheral device 114 stores a keyboard emulation module 212 and in one embodiment, stores a table 214 of financial presentation device verification values (see FIG. 3). Keyboard emulation module 212 is adapted to output signals that a HID (Human Input Device) class driver (not shown) of the operating system of computer 102 recognizes as signals outputted from a standard keyboard device. The HID class driver causes the data to be delivered to a keyboard driver of the operating system of computer 102. In this manner, the peripheral device 114 may mimic the operation of a numerical keypad on a standard keyboard. Alternatively, the checkout webpage of the merchant server 104 may download an applet into the user computer 102 such that it requests and receives the dynamic verification value from the peripheral device 114, and automatically fills in the corresponding input field of the checkout page.

In an exemplary embodiment, memory 204 of peripheral device 114 stores a table 214 which includes a number (e.g., between 10 and 1000) of preset 3-digit dynamic verification values, which are indexed by a transaction number. In other embodiments the dynamic verification values can be 4-digit, 5-digit, or any other number of digits. FIG. 3 illustrates a portion of a table 214 according to one example, including the dynamic verification values which correspond to the first thirty-six (36) transaction numbers. The keyboard emulation module 212 keeps track of the last transaction number that was used to generate the dynamic verification value and is adapted to extract the dynamic verification values from table 214 in sequence, preferably starting with the value associated with transaction number 1. The keyboard emulation module 212 then moves consecutively to the next transaction dynamic verification value for each new transaction or each time the processor is powered on via switch 208. Upon extracting a dynamic verification value, the keyboard emulation module 212 converts the value into signals that the keyboard driver of computer 102 will recognize as signals generated by entering the corresponding numbers using a keyboard.

In alternative embodiments, memory 204 may store an algorithm or value generation module 216 which generates a new dynamic verification value upon activation based on certain stored kernel information such as the account number of the financial presentation device. Exemplary algorithms that may be used to generate dynamic verification values are discussed below and in commonly-assigned U.S. patent application Ser. No. 10/642,878 entitled "Method and System for Generating a Dynamic Verification Value". In these embodiments, the keyboard emulation module 212 receives the newly generated dynamic verification value from value generation module 216 and formats the value in the form of keyboard output signals accordingly.

Two example algorithms that may be used to generate dynamic verification values are counter-based and time-based algorithms, both of which use variable data together with customer account information to generate dynamic verification values.

In a counter-based algorithm a transaction counter stored in the peripheral device increments with each transaction. In one example algorithm, a string is constructed by replacing certain digits of the customer's financial presentation device account number with the transaction counter to create an 'altered account number'. In a second step, the altered account number is concatenated with the expiration date of the account and with other specified digits. The concatenated result is placed into a 128-bit field, and then spit into two blocks, block A and block B. Block A is then encrypted using an encryption key, and the encrypted result (block C) is put through an exclusive OR operation with block B. Resulting block D is then encrypted with the encryption key. After further encryptions, hexadecimal digits are converted into decimal, the blocks are concatenated, and three digits are selected from the concatenated result as the dynamic verification value.

In an example time-based algorithm, the process may be similar, with a time-based number (based on a known time window) used instead of a transaction counter to create the altered account number.

According to these algorithms, even if an unauthorized party was able to obtain financial presentation device account number and expiration date information, there would be no way for the unauthorized party to precisely determine the dynamic verification value without the variable data of a transaction counter or time-based number. Moreover, if an unauthorized party uses a number generating algorithm to continually guess at the dynamic verification value, verification may be disallowed after a certain number (e.g., 2 or 3) of unsuccessful attempts.

Figure 4:
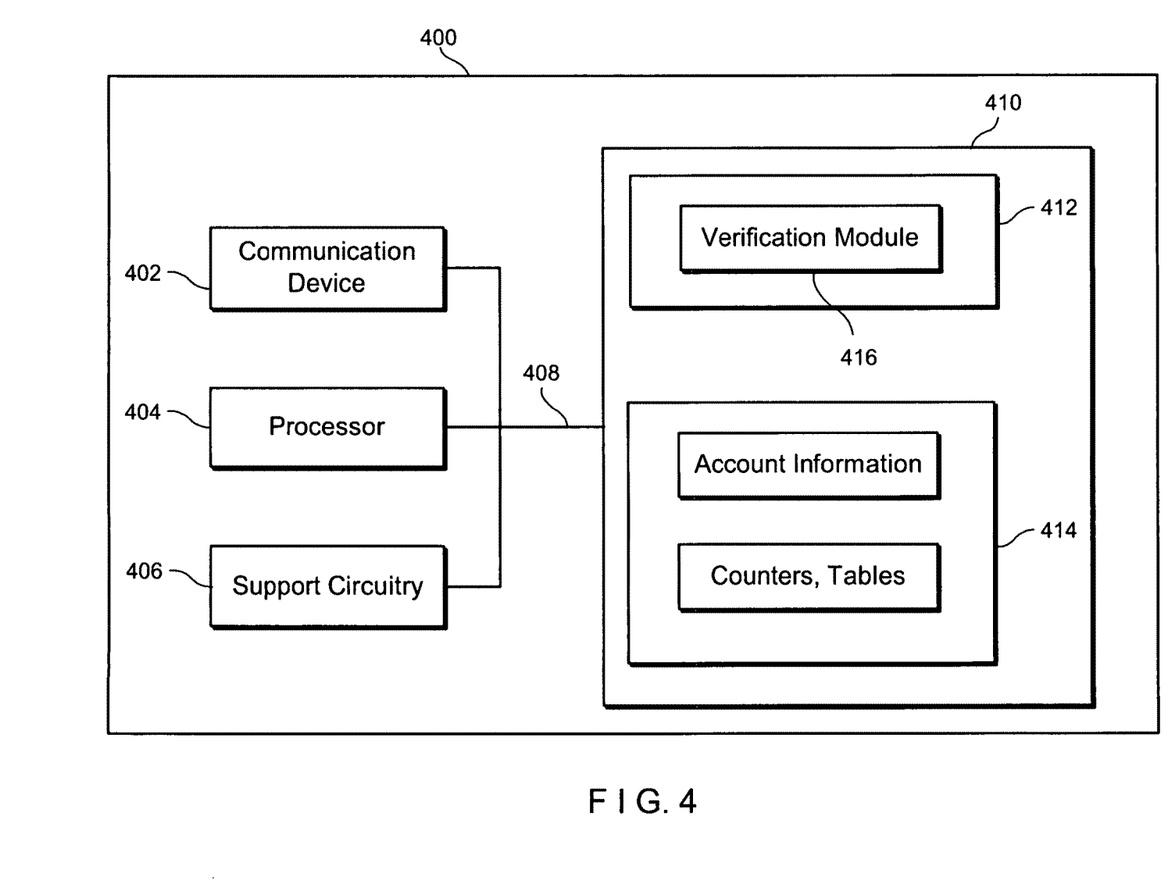
FIG. 4 is a block diagram of an exemplary computer implemented by an authorizing entity that performs authentication of dynamic verification values according to an embodiment of the present invention.

FIG. 4 is a block diagram of an exemplary computer system 400 which may be implemented by authorizing entity 116 for authenticating financial transactions performed using financial presentation devices. In preferred embodiments of the present invention, computer system 400 is implemented at or operated by a financial transaction facilitator such as VISANET. Computer system 400 includes a communication device 402 which sends/receives information via a communication link (not shown) to customer computers 102 and merchant servers 104 although the signal may pass through multiple networks and computers (see FIG. 1), a processor 404, such as a central processing unit (CPU), and support circuitry 406. The communication device 402, processor 404, and support circuitry 406 are commonly connected to a bus 408 which also connects to a memory 410. Memory 410 includes program storage memory 412 and data storage memory 414.

Program storage memory 412 and data storage memory 414 may each comprise volatile (RAM) and non-volatile (ROM) memory units and may also comprise hard disk and backup storage capacity. Program storage memory 412 stores software program modules and associated data, and in particular stores a verification module 416. Verification module 416 is adapted to receive the dynamic verification value generated by peripheral device 114 and to match the dynamic verification value against a comparison verification value which is obtained from a set of stored values (e.g., in a table) or generated by an algorithm that corresponds to the algorithm used to generate the dynamic verification value by peripheral device 114. Received dynamic verification values may be stored in data storage memory 414 along with other stored cardholder information, a table of stored dynamic verification values, and/or values/parameters such as a transaction counter used for generating comparison verification values dynamically according to an algorithm.

It is to be appreciated that the computer system 400 can be any computer such as a personal computer, minicomputer, workstation, mainframe, or a combination thereof. While the computer system 400 is shown, for illustration purposes, as a single computer unit, the system may comprise a group/farm of computers which can be scaled depending on the processing load and database size.

Figure 5:
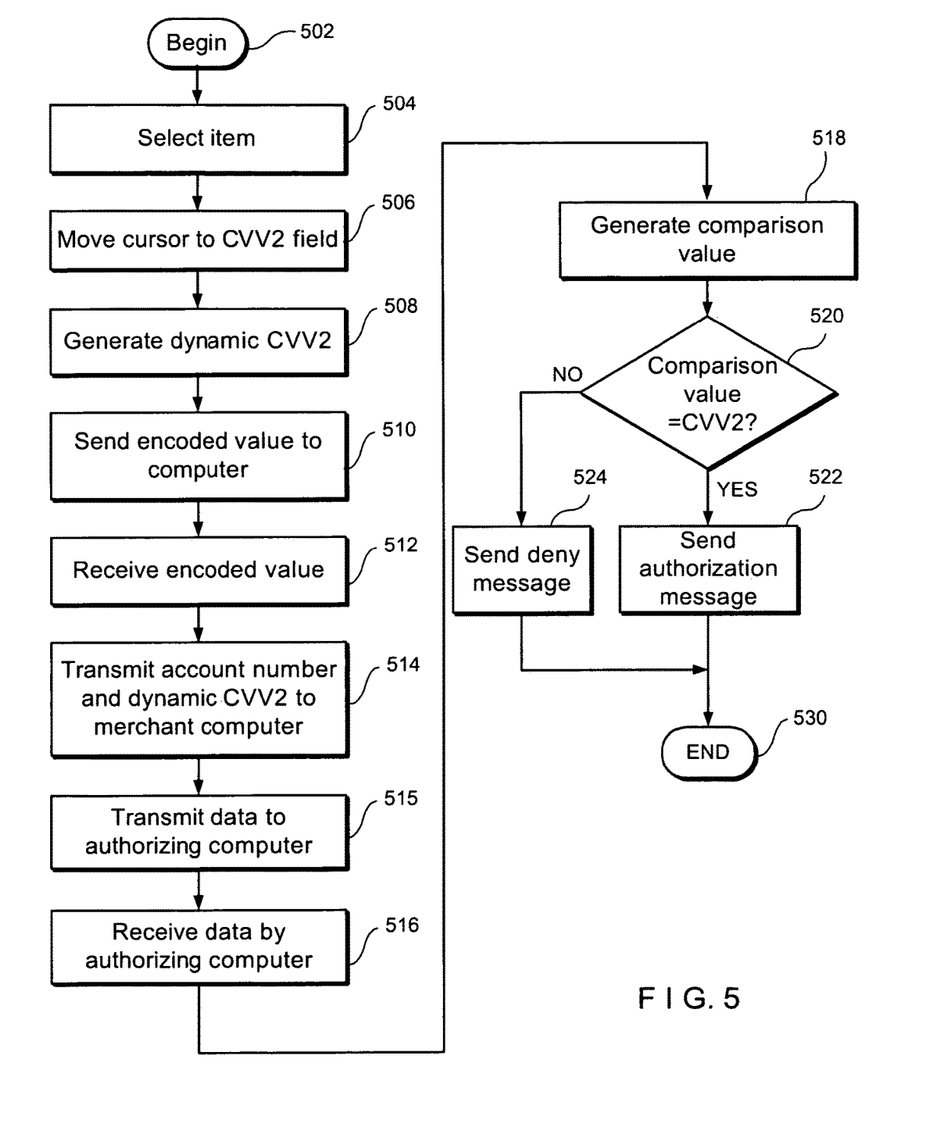
FIG. 5 is a flow chart of a method of dynamically authorizing a financial transaction of a financial presentation device that is presentable to merchants according to the present invention.

FIG. 5 illustrates a flow chart of a method for authenticating a financial transaction in which a peripheral device according to the present invention is used to generate dynamic verification values for the financial presentation device. The method begins in step 502. In step 504, a customer at computer 102 selects an item to purchase on an online merchant site, which then generates a payment details screen during checkout. In step 506, after providing whatever information needs to be input manually, if any, the customer moves the cursor to a dynamic verification value (CVV2) field (e.g., input box) in the payment details screen, and in step 508, activates peripheral device 114 to generate a dynamic verification value which will be inputted into the dynamic verification value field.

In one embodiment, the processor 202 retrieves the last used transaction counter/number and increments it by one and retrieves the verification value corresponding to the new transaction number. For example, if the last used transaction number was 15, the retrieved verification value is 967

(corresponding to transaction number 16) according to the table in FIG. 3. The processor 202 then resets the last used transaction number to 16.

Alternatively, an applet downloaded from the merchant server 104 and running inside the user computer 102 may prompt the user to plug the peripheral device 114 into the computer 102. When the user does so, the processor 202 retrieves an appropriate dynamic verification value from the table 214 as described above and transmits it through the usb port.

In step 510, peripheral device 114 generates a signal that encodes the dynamic verification value as keyboard input and sends the encoded value to user computer 102. In step 512, user computer 102 receives the signal from peripheral device 114 and interprets the signal as keyboard input instructions and enters the dynamic verification value into the dynamic verification value field of the payment details screen.

Upon completion of the payment details screen, in step 514, the online merchant server 104 receives transaction data, including the financial presentation device account number and dynamic verification value. In step 515, merchant server 104 provides the financial presentation device information and dynamic verification value to an acquirer (not shown) using conventional financial presentation device authentication procedures. In step 516, the transaction data is then received from the acquirer by an authorizing computer 400 of the authorizing entity 116. Upon receiving the transaction data including the dynamic verification value, in step 518, the verification module being executed by the processor 404 of authorizing computer 400 generates a comparison verification value to compare with the received dynamic verification value. As explained above, the comparison verification value may be generated using a table corresponding to a table of verification values stored on peripheral device 114, or based on an algorithm that corresponds to an algorithm stored on peripheral device 114.

In the case of using the table, like the peripheral device 114, the verification module 416 maintains the same table and the same last used transaction number. The module 416 increments the last used transaction number by one and retrieves the verification value corresponding to the new transaction number. For example, if the last used transaction number was 15, the retrieved verification value is 967 (corresponding to transaction number 16) according to the table in FIG. 3. The verification module 416 then resets the last used transaction number to 16. The module 416 uses the retrieved value as the comparison verification value.

In step 520, verification module 416 determines whether the comparison verification value matches the dynamic verification value received from the online merchant server 104.

If it is determined in step 520 that the comparison verification value matches the dynamic verification value, then, in step 522, verification module 416 authorizes the transaction (assuming of course that all other tests such as credit limit pass) and sends a notification to the merchant server 104 according to conventional procedures. The method then ends in step 530.

If it is determined in step 520 that the comparison verification value does not match the dynamic verification value, then, in step 524, verification module 416 sends a notification to the merchant server 104 that the financial transaction is denied. The method then ends in step 530.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. A system comprising:
 a financial presentation device associated with a payment account;
 a user computer distinct from the financial presentation device; and
 a peripheral device communicatively coupled with the user computer, the peripheral device being distinct from both the user computer and the financial presentation device as well as uniquely corresponding to the financial presentation device, the peripheral device comprising a first memory configured to store information used to generate a dynamic verification value for the financial presentation device, an I/O interface communicatively coupled with the user computer, and a first processor configured at least to:
  maintain, by the peripheral device communicatively coupled with a user computer, variable data that changes for each of a plurality of financial transactions;
  receive, by the peripheral device, from the user computer, a request to provide the dynamic verification value, the request including data from a financial presentation device associated with a payment account;
  responsive to receiving the request to provide the dynamic verification value, generate, by the peripheral device, the dynamic verification value uniquely for a financial transaction conducted with the uniquely corresponding financial presentation device using the information stored in the first memory, the dynamic verification value being based at least in part on the data from the financial presentation device and the variable data that changes for each of the plurality of financial transactions, the variable data that changes for each of the plurality of financial transactions being a time-based number;
  responsive to generating the dynamic verification value, updating the variable data such that the variable data changes for each of the plurality of financial transactions; and
  responsive to generating the dynamic verification value, providing, by the peripheral device, the generated dynamic value to the user computer thereby at least in part causing transmission, by the peripheral device, the generated dynamic verification value to the user computer via the I/O interface,
 wherein, as part of the financial transaction, the user computer is further configured to transmit the dynamic verification value to an authentication computer, the authentication computer comprising a communication device configured to receive the dynamic verification value generated by the peripheral device, a second memory for storing information used to generate a comparison verification value, a second processor coupled to the second memory and the communication device, and an authentication module executable with the second processor and configured to generate, in response to receiving the dynamic verification value from the user computer, the comparison verification value using the information stored in the second memory and to determine whether to authorize the financial transaction of the financial presentation device based at least in part on a comparison between the comparison verification value and the received dynamic verification value.

2. The system of claim 1, wherein the first memory includes a table of preset dynamic verification values.

3. The system of claim 2, wherein the first processor is further configured to sequentially retrieve a preset value in the table for use as the dynamic verification value.

4. The system of claim 1, wherein the first memory includes a transaction counter that increments or decrements each time a dynamic verification value is generated, and the first processor generates the dynamic verification value based on the transaction counter.

5. The system of claim 1, wherein the peripheral device is USB device and is connectable to the user computer through a USB port.

6. The system of claim 5, wherein the first memory includes a table of preset dynamic verification values.

7. The system of claim 6, wherein the first processor is further configured to sequentially retrieve a preset value in the table for use as the dynamic verification value.

8. The system of claim 7, wherein the user computer is further configured to automatically fill in a checkout page on a display of the user computer with the dynamic verification value received in response to the request to provide the dynamic verification value.

9. The system of claim 1, wherein the peripheral device is configured to include dynamic verification data that uniquely corresponds to the distinct financial presentation device.

10. The system of claim 1, wherein the peripheral device provides the dynamic verification value for the financial transaction independent of user prompting.

11. The system of claim 10, wherein the payment form comprises computer-executable instructions that, when executed by the user computer, causes the user computer to request the dynamic verification value from the peripheral device and enter the provided dynamic verification value for the financial transaction in a corresponding field of a payment form.

12. A method comprising:
maintaining, by a peripheral device communicatively coupled with a user computer, variable data that changes for each of a plurality of financial transactions;
receiving, by the peripheral device coupled with a user computer, a request from the user computer to provide a dynamic verification value, the request including data from a financial presentation device associated with a payment account, the peripheral device being distinct from both the user computer and the financial presentation device as well as uniquely corresponding to the financial presentation device;
responsive to receiving the request, generating, by the peripheral device coupled to the user computer, a dynamic verification value uniquely for a financial transaction conducted with the uniquely corresponding financial presentation device, the dynamic verification value being based at least in part on the data from the financial presentation device and the variable data that changes for each of the plurality of financial transactions, the variable data that changes for each of the plurality of financial transactions being a time-based number;
responsive to generating the dynamic verification value, updating the variable data such that the variable data changes for each of the plurality of financial transactions; and
responsive to generating the dynamic verification value, providing, by the peripheral device, the generated dynamic value to the user computer thereby at least in part causing transmission, by the user computer, as part of the financial transaction, the generated dynamic verification value to an authentication computer,
wherein the authentication computer verifies the dynamic verification value by comparing the dynamic verification value to a comparison authentication value that is generated in response to receiving the generated dynamic verification value from the user computer and determines whether to authorize the financial transaction of the financial presentation device based at least in part on the comparison between the comparison authentication value and the dynamic verification value.

13. The method of claim 12, wherein the step of generating the dynamic verification value includes: generating the dynamic verification value using a table of preset dynamic verification values stored in the peripheral device.

14. The method of claim 13, wherein the step of generating the dynamic verification value using a table of preset dynamic verification values includes extracting, in sequence, a preset value in the stored table.

15. The method of claim 14, wherein the step of generating the dynamic verification value includes generating the dynamic verification value according to a transaction counter stored in a memory of the peripheral device which increments or decrements each time a dynamic verification value is generated.

16. The method of claim 15, wherein the peripheral device is a USB device connectable to the user computer through a USB port; and the step of generating a dynamic verification value includes generating the dynamic verification value using the USB device.

17. The method of claim 12, wherein the time-based number is based at least in part on a time window with respect to the financial transaction.

18. One or more non-transitory computer-readable media collectively storing thereon computer-executable instructions that, when executed with one or more processors, at least:
maintain, by a peripheral device communicatively coupled with a user computer, variable data that changes for each of a plurality of financial transactions;
receive, by the peripheral device coupled with a user computer, a request from the user computer to provide a dynamic verification value, the request including data from a financial presentation device associated with a payment account, the peripheral device being distinct from both the user computer and the financial presentation device as well as uniquely corresponding to the financial presentation device;
responsive to receiving the request, generate, by the peripheral device coupled to the user computer, a dynamic verification value uniquely for a financial transaction conducted with the uniquely corresponding financial presentation device, the dynamic verification value being based at least in part on the data from the financial presentation device and the variable data that changes for each of the plurality of financial transactions, the variable data that changes for each of the plurality of financial transactions being a time-based number;

responsive to generating the dynamic verification value, update the variable data such that the variable data changes for each of the plurality of financial transactions; and responsive to generating the dynamic verification value, provide, by the peripheral device, the generated dynamic value to the user computer thereby at least in part causing transmission, by the user computer, as part of the financial transaction, the generated dynamic verification value to an authentication computer, wherein the authentication computer verifies the dynamic verification value by comparing the dynamic verification value to a comparison authentication value that is generated in response to receiving the generated dynamic verification value from the user computer and determines whether to authorize the financial transaction of the financial presentation device based at least in part on the comparison between the comparison authentication value and the dynamic verification value.

* * * * *

UNITED STATES PATENT AND TRADEMARK OFFICE
CERTIFICATE OF CORRECTION

PATENT NO. : 10,008,067 B2
APPLICATION NO. : 12/483419
DATED : June 26, 2018
INVENTOR(S) : Thomas Manessis It is certified that error appears in the above-identified patent and that said Letters Patent is hereby corrected as shown below:

In Column 10, Claim 18, Line 48 please remove "receive, by the peripheral device coupled with a user" and insert -- receive, by the peripheral device coupled with the user --

Signed and Sealed this
Twenty-fifth Day of September, 2018

Andrei Iancu
*Director of the United States Patent and Trademark Office*